United States Patent
Chen (10) Patent No.: US 10,419,822 B2
(45) Date of Patent: Sep. 17, 2019

(54) METHOD, DEVICE, AND SYSTEM FOR SWITCHING AT A MOBILE TERMINAL OF A SMART TELEVISION AND ACQUIRING INFORMATION AT A TELEVISION TERMINAL

(71) Applicant: Cheng Chen, Hangzhou (CN)

(72) Inventor: Cheng Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/307,787

(22) PCT Filed: Apr. 22, 2015

(86) PCT No.: PCT/CN2015/077168
§ 371 (c)(1),
(2) Date: Oct. 28, 2016

(87) PCT Pub. No.: WO2015/165350
PCT Pub. Date: Nov. 5, 2015

(65) Prior Publication Data
US 2017/0048590 A1    Feb. 16, 2017

(30) Foreign Application Priority Data
Apr. 30, 2014 (CN) .......................... 2014 1 0181217

(51) Int. Cl.
*G06F 3/00* (2006.01)
*G06F 13/00* (2006.01)
(Continued)

(52) U.S. Cl.
CPC ....... *H04N 21/4828* (2013.01); *H04N 21/278* (2013.01); *H04N 21/4126* (2013.01);
(Continued)

(58) Field of Classification Search
CPC .......... H04N 21/4828; H04N 21/4383; H04N 21/472; H04N 21/84; H04N 21/278;
(Continued)

(56) References Cited

U.S. PATENT DOCUMENTS 9,319,740 B2 * 4/2016 Sinha .................. H04N 21/441
9,729,811 B2 * 8/2017 Pan ....................... H04N 5/4403
(Continued)

FOREIGN PATENT DOCUMENTS

CN    101620769 A    1/2010
CN    102523523 A    6/2012
(Continued)

OTHER PUBLICATIONS

PCT International Search Report and Written Opinion dated Jul. 28, 2015, issued in corresponding International Application No. PCT/CN2015/077168 (9 pages).
SIPO First Chinese Search Report issued in Chinese Application No. 201410181217.7 dated Aug. 2, 2017, 1 page.
SIPO First Chinese Office Action issued in Chinese Application No. 201410181217.7 dated Aug. 14, 2017, 13 pages.

* cited by examiner

*Primary Examiner* — Nasser M Goodarzi
*Assistant Examiner* — Patrick A Ryan
(74) *Attorney, Agent, or Firm* — Finnegan, Henderson, Farabow, Garrett & Dunner, LLP (57) ABSTRACT

A method, a public account server, and a mobile terminal for sending and generating a card are disclosed. The method includes: acquiring user information and card information of the mobile terminal; generating card data for the mobile terminal by using a preset card data model according to the user information and the card information of the mobile terminal; and sending the card data to the mobile terminal, so that the mobile terminal receives the card data, acquires a card template corresponding to the card data, and generates the card by using the card data and the card template.

22 Claims, 3 Drawing Sheets

(51) Int. Cl.
*H04N 5/445* (2011.01)
*H04N 21/482* (2011.01)
*H04N 21/278* (2011.01)
*H04N 21/41* (2011.01)
*H04N 21/422* (2011.01)
*H04N 21/435* (2011.01)
*H04N 21/438* (2011.01)
*H04N 21/44* (2011.01)
*H04N 21/472* (2011.01)
*H04N 21/6405* (2011.01)
*H04N 21/84* (2011.01)

(52) U.S. Cl.
CPC ..... *H04N 21/42204* (2013.01); *H04N 21/435* (2013.01); *H04N 21/4383* (2013.01); *H04N 21/44008* (2013.01); *H04N 21/472* (2013.01); *H04N 21/482* (2013.01); *H04N 21/6405* (2013.01); *H04N 21/84* (2013.01)

(58) Field of Classification Search
CPC ......... H04N 21/6405; H04N 21/42204; H04N 21/4126; H04N 21/44008; H04N 21/435
See application file for complete search history.

(56) References Cited

U.S. PATENT DOCUMENTS

| | | | | |
|---|---|---|---|---|
| 2004/0103184 | A1* | 5/2004 | Humpleman | H04L 12/2803 709/223 |
| 2011/0050477 | A1* | 3/2011 | Choi | G06F 3/0346 341/176 |
| 2012/0096503 | A1* | 4/2012 | Slothouber | H04N 21/4126 725/110 |
| 2012/0129496 | A1 | 5/2012 | Park et al. | |
| 2014/0310599 | A1* | 10/2014 | Clift | H04N 21/4126 715/719 |
| 2014/0310742 | A1* | 10/2014 | Kim | H04N 21/485 725/30 |
| 2015/0095933 | A1* | 4/2015 | Blackburn | H04M 7/0078 725/25 |
| 2015/0264439 | A1* | 9/2015 | Karlin | H04N 21/42202 725/12 |

FOREIGN PATENT DOCUMENTS

| | | |
|---|---|---|
| CN | 103079021 A | 5/2013 |
| CN | 103475918 A | 12/2013 |
| EP | 2670119 A1 | 12/2013 |

METHOD, DEVICE, AND SYSTEM FOR SWITCHING AT A MOBILE TERMINAL OF A SMART TELEVISION AND ACQUIRING INFORMATION AT A TELEVISION TERMINAL

CROSS REFERENCE TO RELATED APPLICATION

This application is the U.S. national stage application under 35 U.S.C. § 371 of International Application No. PCT/CN2015/077168, filed on Apr. 22, 2015, which claims priority to and the benefits of priority to Chinese Application No. CN 201410181217.7, filed Apr. 30, 2014, the entire contents of both applications are incorporated herein by reference.

TECHNICAL FIELD

The present disclosure relates to the field of smart TV technologies, and specifically to a method, a device for intelligently switching a data input mode on a mobile terminal for remote controlling a smart television. The present disclosure also provides an information acquiring method and device for smart switching of applications at a smart television terminal, and a smart switching system for a smart television.

BACKGROUND

Currently, smart televisions/boxes are experiencing a dramatic development, and there have been abundant contents that can be carried on a television system, including various types of contents, such as videos and audios, games, and applications related to daily life. However, a physical remote control matching a smart television or a television box generally has several limited functions, for example, it merely has a few function keys, such as up, down, left and right selection keys, a play/pause key, and volume keys. The application of a single physical remote control cannot perform control and selection on the above various applications and contents. To cope with the problem of the conventional physical remote control that it cannot be used universally, a user has to rely on different professional external hardware devices. However, the professional devices generally have a high purchase cost for the user. Furthermore, the user may also replace the above professional hardware devices with a smart mobile terminal (briefly referred to as a mobile terminal, such as a mobile phone and a tablet handheld device) to serve as a soft remote control, and various required APPs are installed on the smart mobile terminal to interact with the smart television or television box.

For example, the smart mobile terminal may be used in the following scenarios:

(1) A common television terminal application only needs to simulate sending key events such as up, down, left, right, enter, and return on the mobile phone to a television terminal, so as to replace the remote control (in the disclosure, the data input mode is referred to as a key remote control mode).

(2) When a video call is performed by using a television, microphone hardware is required for audio input, and when there is no microphone hardware, a collection module of audio data may be implemented on the mobile phone, and the audio data may be sent to the television to replace the microphone (in the disclosure, the data input mode is referred to as a language mode).

(3) For a television game that can only be played with hardware having a gravity sensor, such as a ball-playing type game, mobile phone gravity sensor data collection may be implemented on the mobile phone and the data is sent to the television to replace a professional device (in the disclosure, the data input mode is referred to as a gravity motion sensing mode).

(4) For a television game that can only be played with hardware having a gyroscope, such as a racing type game, mobile phone gyroscope data collection may be implemented on the mobile phone and the data is sent to the television to replace a professional device (in the disclosure, the data input mode is referred to as a gyroscope motion sensing mode).

(5) For a game on the television that needs to play with a joystick, such as an arcade type game, the function of a joystick may be implemented in the mobile phone, and a key message is sent to the television to replace the joystick (in the disclosure, the data input mode is referred to as a joystick mode).

These modes may have many expansions. The implementation method of the above applications when using the mobile terminal is described as follows: first, when being initiated, a television terminal application prompts the user that a corresponding mobile terminal application needs to be downloaded and designates which data input mode needs to be used; then, the user inputs an IP of the television terminal so that the mobile terminal establishes a connection with the application on the television; and then, the user is requested to switch to the designated data input mode. Finally, a mobile terminal instruction or collected data is sent to the corresponding application on the television.

It is not hard to see that the operation process is relatively complicated. Here, in the actual use, there are a large number of applications on the smart television, different data input modes (such as an audio module and a motion sensing data module) of the mobile terminal should be used for different applications or scenarios, therefore it is costly for a common user to learn them, because the user needs to know which data input mode of the mobile terminal software can be used by the application being used on the television.

SUMMARY

The present disclosure relates to the field of smart TV technologies, and specifically to a method, a device for smart switching a data input mode at a mobile terminal of a smart TV. The present disclosure also provides an information acquiring method and device for smart switching of applications at a smart TV terminal, and a smart switching system for a smart TV.

The disclosure provides a method of intelligently switching a data input mode on a mobile terminal for remote controlling a smart television, comprising:

establishing a connection with the smart television terminal;

acquiring feature information of a currently running application from the smart television terminal; and initiating a corresponding data support mode according to the feature information of the application.

For example, the establishing the connection with the smart television terminal comprises:

multicasting a device searching message to a preset address and port in a same network group;

receiving a feedback message of the online smart television terminal in response to the device searching message;

parsing the feedback message, so as to obtain the address and port of the online smart television terminal; and sending a connecting request to the address and port acquired after the parsing, and establishing the connection with the smart television terminal after the request is received.

For example, the establishing the connection with the smart television terminal comprises:

acquiring information of the address and port of a specific smart television terminal in the same network group;

sending a request for establishing the connection to the smart television terminal according to the information of the address and port;

receiving feedback information of the smart television terminal in response to the request for establishing the connection; and establishing the connection with the smart television terminal according to the feedback information.

For example, the acquiring the information of the address and port of a specific smart television terminal in the same network group comprises:

acquiring the information of the address and port of the smart television terminal by scanning a two-dimensional code containing the information of the address and port of the smart television terminal.

For example, the establishing the connection with the smart television terminal comprises:

receiving a device online message sent by the smart television terminal in the network group;

parsing the device online message, so as to obtain information of an address and port of the online smart television terminal; and sending a request for establishing the connection to the address and port acquired after the parsing, and establishing the connection with the smart television terminal upon receiving a response.

For example, the establishing the connection with the smart television terminal comprises establishing a long connection with the smart television terminal.

For example, the acquiring the feature information of the currently running application from the smart television terminal comprises:

receiving the feature information of the currently running application sent by the smart television terminal; or sending query information of the application to the smart television terminal through a long connection channel established with the smart television terminal; and receiving the feature information of the currently running application fed back by the smart television terminal in response to the query information.

For example, the feature information comprises an application name, an application ID, and/or label information indicating the type of the application, wherein the application ID refers to identity information that is assigned to the application and uniquely indicates the application, and the identity information corresponds to the data input mode applicable to the application in a database.

For example, the initiating the corresponding data support mode according to the feature information of the application comprises:

parsing the received feature information, so as to obtain the application name, the application ID, and/or the label information indicating the type of the application of the currently running application;

querying in a local database for the data input mode applicable to the application according to the application name, the application ID, and/or the label information indicating the type of the application;

initiating a corresponding data collection module of the mobile terminal according to the data input mode applicable to the application, and initiating the corresponding data support mode.

For example, the initiating the corresponding data support mode according to the feature information of the application comprises:

parsing the received feature information, and obtaining the name of the currently running application, the application ID, and/or label information indicating the type of the application sending a request for querying the data input mode applicable to the application to a server side according to the application name, the application ID, and/or the label information indicating the type of the application;

receiving information of the data input mode used by the application fed back from the server side;

initializing the corresponding data collection module of the mobile terminal according to the information fed back from the server side, and initiating the corresponding data support mode.

For example, the feature information comprises the application name and the information of the data input mode used by the application.

For example, the initiating the corresponding data support mode according to the feature information of the application comprises:

initiating the corresponding data support mode, or prompting a user to initiate or switch to the corresponding data support mode according to the feature information of the application.

Correspondingly, the disclosure further provides a device for intelligently switching a data input mode on a mobile terminal for remote controlling a smart television, comprising:

a connection unit that establishes a connection with the smart television;

a feature information acquiring unit that acquires feature information of a currently running application in a smart television terminal;

an initiation unit that initiates a corresponding data support mode according to the feature information of the application.

For example, the connection unit comprises:

a multicasting unit that multicasts a device searching message to a preset address and port in a same network group;

a receiving unit that receives a feedback message of the online smart television terminal in response to the device searching message;

a parsing unit that parses the feedback message, so as to obtain an address and a port of the online smart television terminal; and an establishing request unit that sends a request for establishing the connection to the address and port obtained after parsing, and establish the connection with the smart television terminal after the request is received.

For example, the connection unit comprises:

a receiver information acquiring unit that acquires information of the address and port of a particular smart television terminal within a same network group;

a request sending unit that sends the request for establishing the connection to the smart television terminal according to the address and port; and a feedback message receiving unit that receives a feedback message for responding to the request for establishing the connection from the smart television terminal;

a connection establishing unit that establishes the connection with the smart television terminal according to the feedback message.

For example, the receiver information acquiring unit comprises:

a scanning unit that acquires the information of the address and port of the smart television terminal by scanning a two-dimensional code containing the information of the address and port of the smart television terminal.

For example, the connection unit comprises:

a device online message receiving unit that receives a device online message sent within the network group by the smart television terminal;

an information parsing unit that parses the device online message, so as to obtain the information of the address and port of the online smart television terminal;

a connection requesting unit that sends a request for establishing the connection to the address and port obtained after parsing, and establishes the connection with the smart television terminal after the request is received.

For example, the connection unit establishes a long connection with the smart television terminal.

For example, the feature information acquiring unit comprises:

a receiving unit that receives the feature information of the currently running application in the smart television terminal;

or the feature information acquiring unit comprises:

a query unit that sends query information of the application to the smart television terminal through the long connection channel established with the smart television terminal;

a feature information receiving execution unit that receives the feature information of the currently running application fed back by the smart television terminal in response to the query information.

For example, the feature information acquiring unit is specifically configured to acquire an application name, an application ID, and/or label information indicating the type of the application, wherein the application ID refers to identity information that is assigned to the application and uniquely indicates the application, and the identity information corresponds to the data input mode applicable to the application in a database.

For example, the initiation unit comprises:

a feature information parsing unit that parses the received feature information, and obtains the name of the currently running application, the application ID, and/or label information indicating the type of the application;

an input mode querying unit that queries in a local database for the data input mode applicable to the application according to the application name, the application ID, and/or the label information indicating the type of the application;

an initialization executing unit that initiates a corresponding data collection module of the mobile terminal according to the data input mode applicable to the application, and initiates the corresponding data support mode.

For example, the initiation unit comprises:

a feature information parsing unit that parses the received feature information, and obtains the name of the currently running application, the application ID, and/or label information indicating the type of the application;

an input mode querying unit that queries in a local database for the data input mode applicable to the application according to the application name, the application ID, and/or the label information indicating the type of the application;

an input mode information receiving unit that receives information of the data input mode applicable to the application fed back by the server side;

an initialization executing unit that initiates a corresponding data collection module of the mobile terminal according to the data input mode applicable to the application, and initiates the corresponding data support mode.

For example, the initiation unit initiates the corresponding data support mode directly according to the feature information of the application, or prompts a user to initiate or switch to the corresponding data support mode.

Furthermore, the disclosure also provides an information acquiring method for intelligently switching an application at a smart television terminal, comprising:

establishing a connection with a mobile terminal;

detecting a currently running application in the smart television terminal;

acquiring a feature information of the application;

sending the feature information of the currently running application to the mobile terminal.

For example, the establishing the connection with the mobile terminal comprises:

multicasting a message of the smart television terminal being online to a preset address and port in a same network group;

receiving a request for establishing a connection sent by the online mobile terminal, and establishing a connection with the smart television terminal after a response is received.

For example, the establishing the connection with the mobile terminal comprises:

receiving a device searching message sent by the mobile terminal;

sending the feedback message to the mobile terminal according to the device searching message;

parsing the feedback message and acquiring the address and port of the online smart television terminal;

receiving the request for establishing the connection sent by the mobile terminal and establishing the connection with the mobile terminal after the request is received.

For example, the feature information comprises an application name, an application ID, and/or label information indicating a type of the application, and information of a data input mode of the application.

Correspondingly, the acquiring the feature information of the application comprises:

acquiring the application name;

sending a request for querying the data input mode applicable to the application to the server side according to the application name, the application ID, and/or the label information indicating the type of the application;

receiving information of the data input mode applicable to the application fed back by the server side.

Correspondingly, the disclosure further provides an information acquiring device for intelligently switching an application at a smart television terminal, comprising:

a connection establishing unit that establishes a connection with a mobile terminal;

an application detecting unit that detects the currently running application in the smart television terminal;

a feature information acquiring unit that acquires feature information of the application;

a sending unit that sends the feature information of the currently running application to the mobile terminal.

Furthermore, the disclosure also provides a smart switching system for a smart television, comprising the device for intelligently switching a data input mode on a mobile terminal for remote controlling a smart television and the information acquiring device for intelligently switching an application at a smart television terminal according to any one of the technical solutions described above.

Compared with prior art, the disclosure has advantages as follows:

The disclosure provides a method of intelligently switching a data input mode on a mobile terminal for remote controlling a smart television. A connection with the smart television is established, the feature information of the application in the smart television terminal is acquired, and the data support mode of the mobile terminal is initiated according to the feature information. During user's operations on the smart television terminal by using the mobile terminal, the user does not need to manually establish the connection with the smart television terminal, and also does not need to manually initiate or switch the data support mode at the mobile terminal, so that the process of the user's operations on the application software at the mobile terminal is simplified, thereby improving the usability.

DETAILED DESCRIPTION

Implementations of the disclosure will be described in details with reference to accompanying drawings and embodiments, to help with fully understanding of the disclosure. The disclosure may be implemented in other ways different from the ones described herein. Those skilled in the art may apply the disclosure without departing from the spirit of the disclosure. Therefore, the disclosure is not limited to embodiments described hereafter.

One aspect of the disclosure provides a method of intelligently switching a data input mode on a mobile terminal for remote controlling a smart television. In this method, the mobile terminal decides the data input mode according to an application running in the smart television terminal. The television terminal monitors the application running in the foreground in real time, and acquires feature information of the application. A mobile phone terminal determines that which data input mode the application should use, according to the feature information. In the method of the disclosure, the mobile phone terminal determines, by acquiring information of the application of the mobile terminal, an input mode module to be initiated. And it is unnecessary for the user to learn and select a corresponding module to be initialized, as the technical solution disclosed in the prior art. The above method of the disclosure simplifies operations of the user for the mobile terminal, and the user can implement related operations without particular learning. The above method of the disclosure is described in detail in the following in combination with embodiments.

Figure 1:
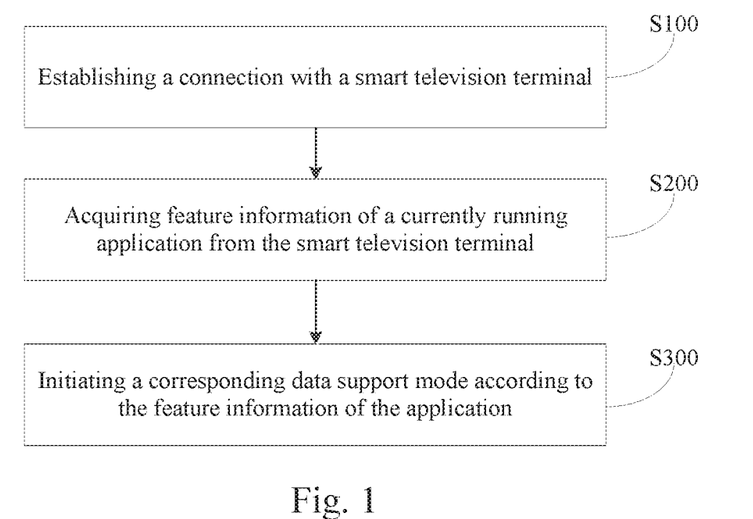
FIG. 1 is a flow chart of a method of intelligently switching a data input mode on a mobile terminal for remote controlling a smart television according to embodiments of the disclosure.

With reference to FIG. 1, it is provided a flow chart of an embodiment of a method of intelligently switching a data input mode on a mobile terminal for remote controlling a smart television.

In the embodiment, the method of intelligently switching the data input mode on a mobile terminal for remote controlling a smart television includes the following steps:

Step 100: establishing a connection with a smart television terminal.

In the embodiment, if it is intended to implement remote control on the smart television terminal by a smart mobile terminal, a connection between the mobile terminal and the smart television terminal needs to be established first. In the embodiment, the establishing the connection with the smart television terminal may be implemented by using the following steps: a client multicasting a device searching message to a preset address and port in a same network group; receiving a feedback message of the online smart television terminal in response to the device searching message; parsing the feedback message, so as to obtain an address and a port of the online smart television terminal; and sending a connecting request to the address and port obtained after parsing; and establishing the connection with the smart television terminal after the request is received.

For example, the same network group may be within a range of a same local area network. The local area network is also referred to as an intranet, referring to a computer network covering a local area. In the area, multiple computers or peripheral devices are interconnected to form a computer group, and functions such as file management, application software sharing, printer sharing, email and fax communication may be implemented in the intranet. Local area network is a term relative to wide area network. A typical local area network is a wireless local area network based on the 802.11 standard. The embodiment of the disclosure is illustrated based on using a wireless local area network as an example. For example, a network group set up through a wireless local area network includes a smart television and a smart phone. For example, the smart television is connected to the local area network in a wired or wireless WIFI manner. The smart phone is connected to the smart television in a wireless WIFI manner. In a specific example, the smart television and the smart phone both run Android operating systems. The smart television terminal and the mobile terminal may further run operating systems such as IOS and Windows phone, and it is unnecessary for the smart television terminal and the mobile terminal to run operating systems of the same type or version.

Of course, the network group of the embodiment is not limited to a network set up through the local area network, and may also be a network that is formed by setting up in another manner, established through a certain other information interaction manner, and can implement information and wireless signal interaction. For example, network connections established through WIPI, Bluetooth signals or infrared signals.

As described in the above, after the smart television and the mobile terminal both access to the same local area network, a connection between the two should be further established. One implementation of the connection is initiating a multicast technology by the mobile terminal, and sending a message of multicasting and searching for devices to a preset port and address in the local area network. The multicast technology is one of three manners of transmitting IP network data. And correspondingly, there are also a unicast transmission and a broadcast transmission. The multicast technology implements a point-to-multipoint network connection between a sender and each receiver. If one sender transmits the same data to multiple receivers at the same time, it only needs to copy the same data packet. Therefore, the data transmission efficiency may be improved, bandwidth occupation may be reduced, and network congestion is avoided. The multicast technology transmits an IP data packet to a set of hosts in a multicast group, according to a maximum deliver principle by using a specific IP multicast address. In the multicast technology, the sender of information (data) is referred to as a multicast source, an information receiver is referred to as a multicast group of the information, and a router for supporting a multicast information transmission is referred to as a multicast router. In the multicast transmission technology, when the multicast source sends data to the multicast group, it is unnecessary to send the data to each member of the multicast group, and it only needs to send the data to a particular preset address, so that all members joining this group can receive the data.

For example, in the embodiment, all members in the local area network form the members of the multicast group, and the mobile terminal sends a searching device searching message to all members of the multicast group according to an IP address and a port of each member. Upon sending the message, the mobile terminal may or may not send the searching message of searching for device to the mobile terminal itself. After the smart television terminal receives the message sent by the mobile terminal, the smart television terminal sends to the mobile terminal a feedback message including an address and a port of the smart television terminal in response to the message. After the mobile terminal receives the feedback message of the smart television terminal, the mobile terminal parses the message, so as to obtain information of the IP address and the port of the smart television terminal, and sends a request for establishing a connection to the smart television terminal. The smart television terminal receives the request for establishing the connection and sends an acknowledgment message.

By means of the above steps, the mobile terminal and the smart television terminal establish a connection channel, where the connection between the mobile terminal and the smart television terminal is specifically a long connection in the embodiment. The long connection refers to a connection manner that is always kept after a connection between communication entities is established. A basic measure of keeping the long connection between the communication entities is defining a heartbeat message between the communication entities. The heartbeat message is periodically sent, so as to monitor whether a communication link between systems is abnormal. The heartbeat message is sent at an interval. If no heartbeat message is received for a certain times, it is considered that the connection has a problem and needs to be disconnected and re-established. A format of the heartbeat message, the interval for sending the heartbeat message, how many times without receiving the heartbeat being considered as a linkage abnormality, and whether the data packet being considered as the heartbeat message (some system may clear the heartbeat timer if a data packet is received, which is equivalent that the data packet in the system is also considered as the heartbeat message), it is necessary for the two terminals having the connection established to perform a negotiation. A typical long connection is a TCP long connection. The TCP connection generally needs to be implemented by three handshakes. In an ideal state, once the TCP connection is established, the TCP connection will be always kept until any of the two parties of communication actively closes the connection. The long connection of the embodiment may specifically be the TCP long connection.

Of course, the connection established between the mobile terminal and the smart television terminal may not necessarily be a long connection, and may also be a short connection. When it needs to send data information between the mobile terminal and the smart television terminal, a connection is established. And when it does not need to send data information, the connection between the mobile terminal and the smart television terminal is disconnected.

In the above specific embodiment, the address and port of the smart television terminal are acquired in a manner that the mobile terminal actively sends the searching message, and a connection between the smart television terminal and the mobile terminal is established. In another example, the mobile terminal may also directly establish the connection with the mobile terminal after acquiring the specific IP address and the port of the smart television terminal, and the specific steps are: acquiring information of an address and a port of a specific smart television terminal in the same network group; sending a request for establishing a connection to the smart television terminal according to the information of the address and port; receiving feedback message of the smart television terminal in response to the request for establishing the connection; and establishing the connection with the smart television terminal according to the feedback information. The mobile terminal may acquire the information of the address and port of the connected smart television terminal in various manners. For example, the smart television terminal may display the information of the address and port in the network group on a display screen in a manner of a two-dimensional code. The mobile terminal scans the two-dimensional code, and acquires the information of the address and port of the smart television terminal after the two-dimensional code is read and parsed.

Furthermore, the smart television terminal may also send a message that the smart television is online within the network group after the smart television terminal joins into the local area network group. The mobile terminal receives the message and establishes the connection with the smart television terminal. The implementation process is: receiving a device online message sent by the smart television terminal in the network group; parsing the device online message, so as to obtain information of an address and a port of the smart television terminal that is online; and sending a connecting request to the address and port acquired after the parsing, and establishing a connection with the smart television terminal upon receiving a response. The smart television terminal may send a message about the smart television terminal being online in the network group by using the above multicast technology, and may also send the message in other manners.

After the mobile terminal establishes the connection with the smart television terminal, interaction may be implemented through the connection channel established between the mobile terminal and the smart television terminal, and a specific implementation manner may be obtained with reference to the following steps.

Step 110: acquiring feature information of a currently running application in the smart television terminal.

In this step, acquiring the feature information of the currently running application in the smart television terminal may be implemented at least in the following two manners.

One manner is that the smart television terminal actively sends the feature information of the application running in the smart television terminal. Running program detection may be initiated at the smart television terminal, so as to detect in real time the currently running application. The feature information of the application obtained by the detection is sent to the mobile terminal through the connection channel of the previously established long connection. Of course, the application scenario may also be that the feature information of newly-added initiating application is sent to the mobile terminal when an application list of the smart television terminal under real-time detection has changes as compared with the previous detection result. Anyway, the smart television terminal may acquire, by initiating a detection function, the application running in the smart television terminal, and send the feature information of the application to the mobile terminal.

In this step, the feature information includes an application name, an application ID, and/or label information indicating the type of the application. The application ID, for example, refers to identity information that is assigned to the application and uniquely indicates the application, and the identity information corresponds to a data input mode applicable to the application in a database. The database may be stored at the smart television terminal locally, and may also be stored at a side of an application management server. No matter where the database is stored, one-to-one correspondence of the application ID and an applicable data input mode thereof is established in the database. The data input mode includes modes mentioned in the Background, such as the key remote control mode, the language mode, the gravity motion sensing mode, the gyroscope motion sensing mode, and the joystick mode. Of course, there may be many other data input modes, including any audio input, text information input, touch control input, motion sensing data sensing input, and the like. Not all of them are listed herein. Those skilled in the art may be appreciated that, all information interaction modes with intelligent devices are included in the input mode of the disclosure.

It can also be known from the above description that, the application ID in the database may establish correspondences with two or more data input modes. For example, some applications need both the language mode and the gravity motion sensing mode, or may further need the gyroscope motion sensing mode. For the database stored in the smart television terminal locally, after the application name and the corresponding ID are acquired by the smart television terminal, the smart television terminal may query the local database for its information of the data input mode. When the database is stored at the side of the application management server, it is further required to access a side of the management server. The side of the management server delivers the information of the data input mode of the application.

After the smart television terminal acquires the feature information such as the application name, the application ID, the information of the data input mode, and the label information indicating the type of the application, the smart television terminal may select any of the feature information or a combination of two and more feature information to be sent to a mobile terminal. The mobile terminal simply needs to receive the feature information. When the smart television terminal sends the feature information to the mobile terminal, the feature information data may be packaged into an extensible data format. For example, an extensible data format, such as json and XML, may be adopoted. One reason for adopting the extensible data format is facilitating adding a field. And another reason is good generality. The mobile terminal and the smart television terminal may respectively set meanings at their ends. For example, the smart television terminal may transmit data by using the following json format:

{"package_name": "fly game", "id": "com.yunos.flygame"};

After receiving the above packaged data, the mobile terminal may obtain the feature information of the application by parsing.

Different from the manner of the mobile terminal passively acquiring the feature information of the currently running application in the smart television terminal, the mobile terminal may further acquire the feature information of the application in a manner of active querying, which is the second manner of the embodiment.

The mobile terminal first sends query information for the application to the smart television terminal through the long connection channel established with the smart television terminal, and receives the feature information of the currently running application fed back by the smart television terminal in response to the query information. After receiving the query information, the smart television terminal may initiate the first detection process as described above, so as to acquire the feature information of the application and send the information to the mobile terminal. Description for the detection process on the smart television terminal will be omitted herein.

In the foregoing descriptions, two methods for the mobile terminal to acquire the feature information of the currently running application in the smart television terminal are provided. It should be noted that, in this step, how the smart television terminal acquires the feature information of the application is not limited herein. And any method capable of acquiring the feature information of the application may be adopted. For example, in addition to the above method of acquiring the feature information of the application by detecting, an application initiated at the smart television terminal may also actively report its application feature information to the smart television terminal, and send the information to the mobile terminal through a connection channel established between the smart television terminal and the mobile terminal.

After the mobile terminal acquires the feature information of the application, a support module of the corresponding data input mode may be initiated according to the feature information.

Step 120: A corresponding data support mode is initiated according to the feature information of the application.

After receiving the data sent by the smart television terminal, the mobile terminal parses the data, so as to obtain the feature information of the application. A data support mode of the mobile terminal is initiated or switched by using different steps according to different combinations of feature information included in a received data packet sent by the smart television terminal.

For example, if the feature information after parsing does not include a data input mode applicable to the application, the data input mode needs to be acquired by querying, and the specific steps are as follows: parsing the received feature information, and obtaining the name of the currently running application, the application ID, and/or label information indicating the type of the application; querying in a local database for the data input mode applicable to the application according to the application name, the application ID, and/or the label information indicating the type of the application; initializing a corresponding data collection module of the mobile terminal according to the data input mode applicable to the application, and initiating a corresponding data support mode; or prompting the user to initiate or switch to the corresponding data support mode. In other words, data including the data input mode applicable to the application may also be stored locally in the mobile terminal, and the data input mode of the application is acquired by querying the local database of the mobile terminal.

Of course, if the database exists at the side of the management server of the application, it is necessary to access the side of the management server to obtain the corresponding data input mode, and the implementation steps are as follows: parsing the received feature information, and obtaining the name of the currently running application, the application ID, and/or label information indicating the type of the application; sending a request for querying a data input mode applicable to the application to the server side according to the application name, the application ID, and/or the label information indicating the type of the application; receiving information of the data input mode used by the application fed back by the server side; initializing a corresponding data collection module of the mobile terminal according to the information fed back by the server side, and initiating a corresponding data support mode; or prompting the user to initiate or switch to the corresponding data support mode. After the data support mode of the application requiring support is acquired, the data support mode of the corresponding application may be initiated at the mobile terminal. For example, an application running in the smart television terminal needs the gravity motion sensing mode and the gyroscope motion sensing mode, and these two data support modes may be initiated at the mobile terminal, so that the user may control the application at the mobile terminal directly according to the initiated data support modes.

If the feature information after being parsed by the mobile terminal does not include the data input mode applicable to the application, the corresponding data input mode may be initiated directly by using the parsed information.

In the above embodiment, by establishing the connection with the smart television terminal and acquiring the feature information of the application of the smart television terminal, the data support mode of the mobile terminal is initiated according to the feature information. During user's operations on the smart television terminal by using the mobile terminal, the user does not need to manually establish the connection with the smart television terminal, and also does not need to manually initiate or switch the data support mode at the mobile terminal, so that the process of the user's operations on the application software at the mobile terminal is simplified, thereby improving the usability.

Figure 2:
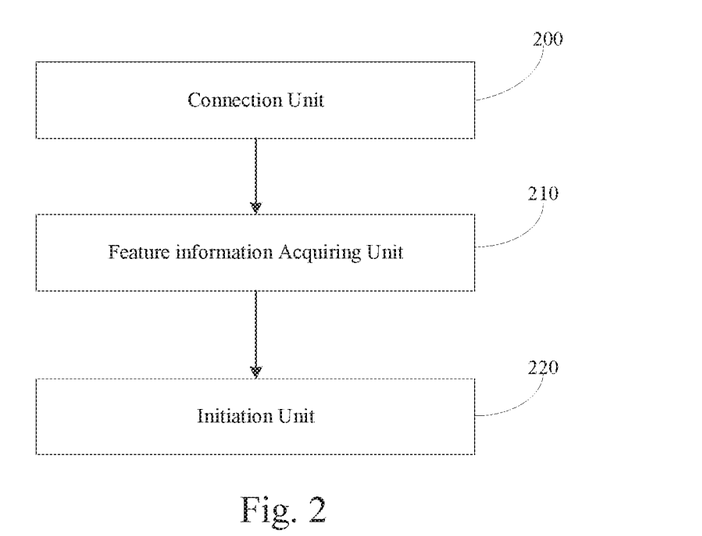
FIG. 2 is an illustrative diagram of a device for intelligently switching a data input mode on a mobile terminal for remote controlling a smart television according to the embodiments of the disclosure.

Corresponding to the above method of intelligently switching the data input mode on the mobile terminal for remote controlling a smart television, the disclosure further provides an apparatus for intelligently switching a data input mode on a mobile terminal for remote controlling a smart television. With reference to FIG. 2, an illustrative diagram of a device for intelligently switching a data input mode on a mobile terminal for remote controlling a smart television according to the embodiments of the disclosure. Because the device of the embodiment is essentially similar to the method embodiment described above, simple descriptions are made herein merely. Related parts may be referred to the above method embodiments, the description of which will be omitted herein.

In the embodiment, a device for intelligently switching a data input mode on a mobile terminal for remote controlling a smart television is provided. The device includes: a connection unit 200 that establishes a connection with the smart television; a feature information acquiring unit 210 that acquires feature information of a currently running application in the smart television terminal; an initiation unit 220 that initiates a corresponding data support mode according to the feature information of the application.

For example, the connection unit 200 includes:
a multicasting unit that multicasts a device searching message to a preset address and port in a same network group;
a receiving unit that receives a feedback message of the online smart television terminal in response to the device searching message;
a parsing unit that parses the feedback message, so as to obtain an address and a port of the online smart television terminal; and
an establishing request unit that sends a request for establishing the connection to the address and port obtained after parsing, and establishes the connection with the smart television after the request is received.

For example, the connection unit 200 includes:
a receiver information acquiring unit that acquires information of the address and port of a particular smart television within the same network group;
a request sending unit that sends a request for establishing the connection to the smart television terminal according to the address and port; and
a feedback message receiving unit that receives a feedback message for responding to the request for establishing the connection from the smart television terminal;
a connection establishing unit that establishes the connection with the smart television terminal according to the feedback information.

For example, the receiver information acquiring unit includes:
a scanning unit that acquires the information of the address and port of the smart television terminal by scanning a two-dimensional code of the address and port of the smart television terminal.

For example, the connection unit includes:
a device online message receiving unit that receives a device online message sent within the network group by the smart television terminal;
an information parsing unit that parses the device online message, so as to obtain information of the address and port of the online smart television terminal;
a connection requesting unit that sends a request for establishing the connection to the address and port obtained after parsing, and establishes the connection with the smart television terminal after the request is received.

For example, the connection unit is specifically configured to establish a long connection with the smart television terminal.

For example, the feature information acquiring unit 210 includes:
a receiving unit that receives the feature information of a currently running application in the smart television terminal.

Or, the feature information acquiring unit 210 includes:

a query unit that sends query information of the application to the smart television terminal through the long connection channel established with the smart television terminal;

a feature information receiving execution unit that receives the feature information of the currently running application fed back by the smart television terminal in response to the query information.

For example, the feature information acquiring unit 210 is configured to acquire an application name, an application ID, and/or label information indicating the type of the application. The application ID, for example, refers to identity information that is assigned to the application and uniquely indicates the application, and the identity information corresponds to a data input mode applicable to the application in a database.

For example, the initiation unit 220 includes:

a feature information parsing unit that parses the received feature information, and obtain the name of the currently running application, the application ID, and/or label information indicating the type of the application;

an input mode querying unit that queries in a local database for a data input mode applicable to the application according to the application name, the application ID, and/or the label information indicating the type of the application;

an initialization executing unit that initiates a corresponding data collection module of the mobile terminal according to the data input mode applicable to the application, and initiate a corresponding data support mode.

For example, the initiation unit 220 includes:

a feature information parsing unit that parses the received feature information, and obtain the name of the currently running application, the application ID, and/or label information indicating the type of the application;

an input mode querying unit that queries in a local database for the data input mode applicable to the application according to the application name, the application ID, and/or the label information indicating the type of the application;

an input mode information receiving unit that receives information of the data input mode applicable to the application fed back by the server side;

an initialization executing unit that initiates a corresponding data collection module of the mobile terminal according to the data input mode applicable to the application, and initiates a corresponding data support mode.

For example, the initiation unit 220 specifically initiates the corresponding data support mode directly according to the feature information of the application, or prompts the user to initiate or switch to the corresponding data support mode.

Figure 3:
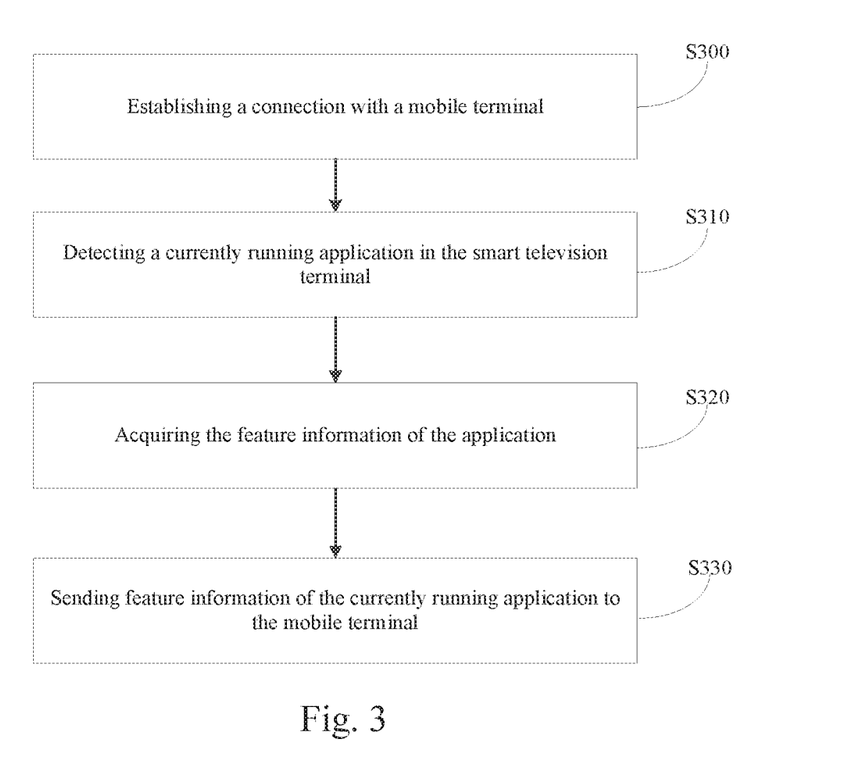
FIG. 3 is a flow chart of an information acquiring method for intelligently switching applications at a smart television terminal according to the embodiments of the disclosure.

Further, corresponding to the method of intelligently switching a data input mode on a mobile terminal, an information acquiring method for intelligently switching an application at the smart television terminal is provided. With reference to FIG. 3, a flow chart of the information acquiring method for intelligently switching the application at the smart television terminal according to the embodiments of the disclosure is illustrated. The method includes:

Step 300: establishing a connection with a mobile terminal.

In the embodiment, the manner of establishing the connection between the smart television terminal and the mobile terminal is the same as the implementation of establishing the connection with the smart television terminal in the above embodiment. Description will be omitted herein. Related parts may be obtained with reference to the descriptions on the embodiment of the above information acquiring method of intelligently switching applications on a smart television terminal.

Step 310: detecting a currently running application in the smart television terminal.

The smart television terminal may acquire the application running in the smart television terminal in real-time or periodically. The application running in the smart television terminal may also actively report feature information of the application. Related parts may be obtained with reference to the descriptions on the embodiment of the above information acquisition method of intelligently switching applications on a smart television terminal.

Step 320: acquiring the feature information of the application.

The smart television terminal acquires, through the name of the application according to the currently running application that is detected, the application ID, and/or label information indicating the type of the application and information of data input mode used by the application. Related parts may be obtained with reference to the descriptions on the embodiment of the above information acquisition method of intelligently switching applications on a smart television terminal.

Step 330: sending feature information of the currently running application to the mobile terminal.

After acquiring the feature information of the application being run by the smart television terminal, the smart television terminal sends the feature information to the mobile terminal through a connection channel established with the mobile terminal. Before sending the feature information, data that is to be sent may be formatted in a manner of injecting json or XML. Related parts may be obtained with reference to the descriptions on the embodiment of the above information acquisition method of intelligently switching applications on a smart television terminal, which will not be further described herein.

By means of above manners, a smart television terminal sends information of the currently running application in the smart television terminal to the mobile terminal, and the mobile terminal initiates a corresponding data input mode after the feature information is received. The user may control the smart television terminal by the mobile terminal.

Figure 4:
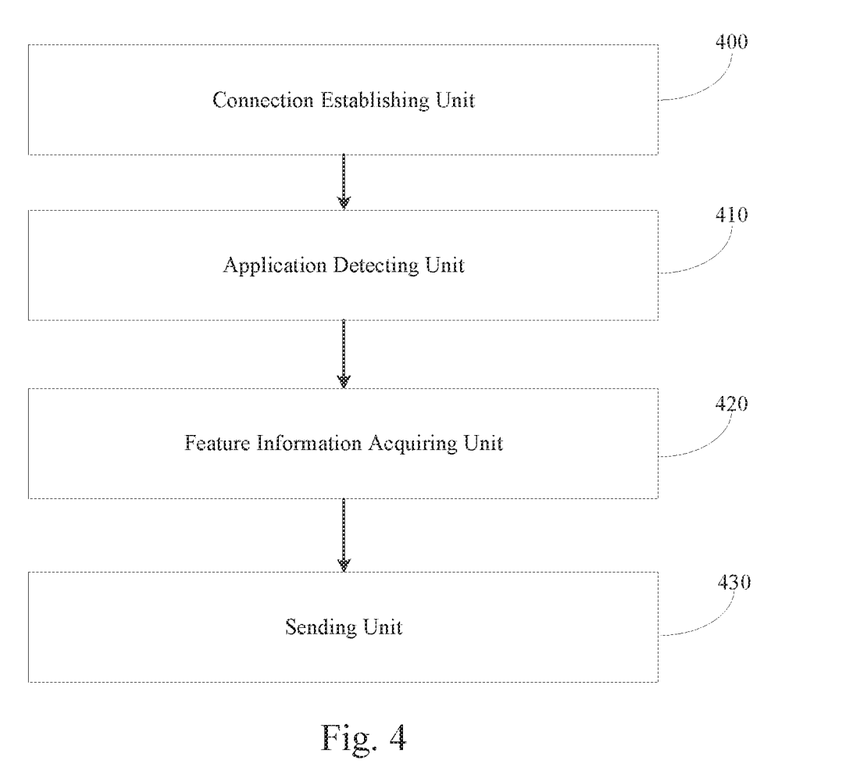
FIG. 4 is an illustrative diagram of an information acquiring device for intelligently switching applications at a smart television terminal according to the embodiments of the disclosure.

Corresponding to the information acquiring method for intelligently switching the application on the smart television terminal, an information acquiring device for intelligently switching an application at a smart television terminal is provided. With reference to FIG. 4, a flow chart of the information acquiring method for intelligently switching the application at the smart television terminal according to the embodiments of the disclosure is illustrated. Because the device according to the embodiments of the disclosure is essentially similar to the above method according to the embodiments, only simple description will be provided herein. Related parts may be referred to the above method according to the embodiments, and description of which will be omitted herein.

In the embodiments, an information acquiring device for intelligently switching an application at a smart television terminal is provided. The information acquiring device includes: a connection establishing unit 400 that establishes a connection with a mobile terminal; an application detecting unit 410 that detects the currently running application in the smart television terminal; a feature information acquiring unit 420 that acquires feature information of the application; a sending unit 430 that sends the feature information of the currently running application to the mobile terminal.

Figure 5:
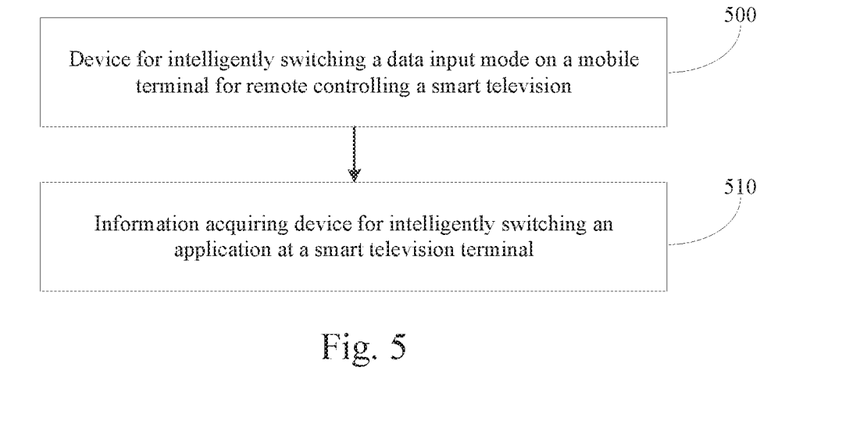
FIG. 5 is an illustrative diagram of an embodiment of an intelligent switching system for a smart television according to the disclosure.

Further, the disclosure further provides an intelligent switching system for a smart television according to the disclosure. With reference to FIG. 5, an intelligent switching system for a smart television according to the disclosure is provided. The intelligent switching system includes: a device 500 for intelligently switching a data input mode on a mobile terminal for remote controlling a smart television, and an information acquiring device 510 for intelligently switching an application at a smart television terminal. Implementations of the related devices 500 and 510 may be referred to description of the above embodiments, and description of which will be omitted herein.

In a typical configuration, a computer device includes one or more Central Processing Units (CPUs), an input/output interface, a network interface, and a memory.

The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more computer-readable storage media (including but not limited to a magnetic disk memory, a CD-ROM, an optical memory, etc.) containing computer-readable program codes.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method of switching a data input mode on a mobile terminal for controlling a smart television, comprising:
    establishing a connection with the smart television;
    acquiring feature information of a currently running application in the smart television from the smart television; and
    initiating a data support mode according to the feature information of the currently running application, wherein the feature information acquired from the smart television includes identity information of the application, the identity information corresponds to a data input mode applicable to the application.

2. The method of claim 1, wherein the establishing the connection with the smart television comprises:
    multicasting a device searching message to devices in a same network group;
    receiving a feedback message of the online smart television in response to the device searching message;
    parsing the feedback message, so as to obtain an address and port of the smart television; and
    sending a request for establishing the connection to the address and port acquired by parsing, and establishing the connection with the smart television after the request is received.

3. The method of claim 1, wherein the establishing the connection with the smart television comprises:
    acquiring information of an address and port of the smart television in the same network group;
    sending a request for establishing the connection to the smart television according to the information of the address and port;
    receiving feedback information of the smart television in response to the request for establishing the connection; and
    establishing the connection with the smart television according to the feedback information.

4. The method of claim 3, wherein the acquiring the information of the address and port of the smart television in the same network group comprises:
    acquiring the information of the address and port of the smart television by scanning a two-dimensional code containing the information of the address and port of the smart television.

5. The method of claim 1, wherein the establishing the connection with the smart television comprises:
    receiving a device online message sent by the smart television in the network group, wherein the device online message contains information of an address and port of the smart television;
    parsing the device online message, so as to obtain the information of the address and port of the smart television; and
    sending a request for establishing the connection to the address and port acquired by parsing, and establishing the connection with the smart television upon receiving a response.

6. The method of claim 1, wherein the establishing the connection with the smart television comprises establishing a long connection with the smart television.

7. The method of claim 1, wherein the acquiring the feature information of the currently running application from the smart television comprises:

receiving the feature information of the currently running application sent by the smart television; or sending query information of the application to the smart television; and receiving the feature information of the currently running application fed back by the smart television in response to the query information.

8. The method of claim 1, wherein the feature information comprises an application name, an application ID, and/or label information indicating the type of the application, wherein the application ID contains the identity information that is assigned to the application and uniquely indicates the application, and the identity information corresponds to the data input mode applicable to the application in a database.

9. The method of claim 8, wherein the initiating the data support mode according to the feature information of the application comprises:

parsing the received feature information, so as to obtain the application name, the application ID, and/or the label information indicating the type of the application of the currently running application;

querying in a local database for the data input mode applicable to the application according to the application name, the application ID, and/or the label information indicating the type of the application;

initiating a data collection module of the mobile terminal according to the data input mode applicable to the application, and initiating the data support mode.

10. The method of claim 8, wherein the initiating the data support mode according to the feature information of the application comprises:

parsing the received feature information, and obtaining the name of the currently running application, the application ID, and/or label information indicating the type of the application sending a request for querying the data input mode applicable to the application to a server side according to the application name, the application ID, and/or the label information indicating the type of the application;

receiving information of the data input mode used by the application fed back from the server side;

initializing the data collection module of the mobile terminal according to the information of the data input mode fed back from the server side, and initiating the data support mode.

11. The method of claim 1, wherein the feature information comprises the application name and the information of the data input mode used by the application.

12. The method of claim 1, wherein the initiating the data support mode according to the feature information of the application comprises:

initiating the data support mode according to the feature information, or prompting a user to initiate or switch to the data support mode according to the feature information of the application.

13. The method of claim 1, wherein the data support mode changes corresponding to the data input mode applicable to the application.

14. An information acquiring method for switching an application at a smart television, comprising:

establishing a connection with a mobile terminal;

detecting a currently running application in the smart television;

acquiring a feature information of the application;

sending feature information of the currently running application to the mobile terminal, wherein the feature information includes identity information of the application, and the identity information corresponds to a data input mode applicable to the application, wherein the identity information enables the mobile terminal to control the smart television according to the data input mode.

15. The information acquiring method of claim 14, wherein the establishing the connection with the mobile terminal comprises:

multicasting a message of the smart television being online to a preset address and port in a same network group;

receiving a request for establishing a connection sent by the mobile terminal, and establishing a connection with the mobile terminal after a response is received.

16. The information acquiring method of claim 14, wherein the establishing the connection with the mobile terminal comprises:

receiving a device searching message sent by the mobile terminal;

sending the feedback message to the mobile terminal according to the device searching message;

parsing the feedback message and acquiring the address and port of the smart television;

receiving the request for establishing the connection sent by the mobile terminal and establishing the connection with the mobile terminal after the request is received.

17. The information acquiring method of claim 14, wherein the feature information comprises an application name, an application ID, and/or label information indicating a type of the application, and information of the data input mode of the application.

18. An information acquiring device for switching an application at a smart television, comprising:

a memory storing program instructions; and a processor configured to execute the program instructions to:

establish a connection with a mobile terminal;

detect the application that is currently running in the smart television;

acquire feature information of the application that is currently running in the smart television;

send the feature information of the application that is currently running in the smart television to the mobile terminal, wherein the feature information includes identity information of the application, and the identity information corresponds to a data input mode applicable to the application, wherein the identity information enables the mobile terminal to control the smart television according to the data input mode.

19. A non-transitory computer readable medium that stores a set of instructions that is executable by at least one processor of an information acquiring device to cause the information acquiring device to perform an information acquiring method for switching an application at a smart television, comprising:

establishing a connection with a mobile terminal;

detecting a currently running application in the smart television;

acquiring a feature information of the application;

sending feature information of the currently running application to the mobile terminal, wherein the feature information includes identity information of the application, and the identity information corresponds to a data input mode applicable to the application, wherein the identity information enables the mobile terminal to control the smart television according to the data input mode.

20. The non-transitory computer readable medium of claim 19, wherein the establishing the connection with the mobile terminal comprises:

multicasting a message of the smart television being online to a preset address and port in a same network group;

receiving a request for establishing a connection sent by the mobile terminal, and establishing a connection with the smart television after a response is received.

21. The non-transitory computer readable medium of claim 20, wherein the establishing the connection with the mobile terminal comprises:

receiving a device searching message sent by the mobile terminal;

sending the feedback message to the mobile terminal according to the device searching message;

parsing the feedback message and acquiring the address and port of the smart television;

receiving the request for establishing the connection sent by the mobile terminal and establishing the connection with the mobile terminal after the request is received.

22. The non-transitory computer readable medium of claim 20, wherein the feature information comprises an application name, an application ID, and/or label information indicating a type of the application, and information of the data input mode of the application.

\* \* \* \* \*